United States Patent
Grönfors et al.

(10) Patent No.: US 10,633,272 B2
(45) Date of Patent: Apr. 28, 2020

(54) RECOVERY OF PHOSPHORUS COMPOUNDS FROM WASTEWATER

(71) Applicant: KEMIRA OYJ, Helsinki (FI)

(72) Inventors: Outi Grönfors, Espoo (FI); Hanna-Mari Kangaslahti, Espoo (FI); Bengt Hansen, Espoo (FI); Sakari Halttunen, Espoo (FI); Fazlollah Azarnoush, Espoo (FI)

(73) Assignee: KEMIRA OYJ, Helsinki (FI)

( * ) Notice: Subject to any disclaimer, the term of this patent is extended or adjusted under 35 U.S.C. 154(b) by 26 days.

(21) Appl. No.: 16/064,001

(22) PCT Filed: Dec. 21, 2016

(86) PCT No.: PCT/EP2016/082147
§ 371 (c)(1),
(2) Date: Jun. 19, 2018

(87) PCT Pub. No.: WO2017/108930
PCT Pub. Date: Jun. 29, 2017

(65) Prior Publication Data
US 2019/0002321 A1  Jan. 3, 2019

(30) Foreign Application Priority Data
Dec. 21, 2015 (FI) .................................... 20155977

(51) Int. Cl.
*C02F 9/00* (2006.01)
*C05B 17/00* (2006.01)
(Continued)

(52) U.S. Cl.
CPC .................. *C02F 9/00* (2013.01); *C05B 7/00* (2013.01); *C05B 17/00* (2013.01); *C05F 7/00* (2013.01);
(Continued)

(58) Field of Classification Search
None
See application file for complete search history.

(56) References Cited

U.S. PATENT DOCUMENTS

| 2006/0108291 A1* | 5/2006 | Lakshman ............... A01C 3/00 210/724 |
| 2013/0213883 A1 | 8/2013 | Josse et al. |

(Continued)

FOREIGN PATENT DOCUMENTS

JP      2002205077 A      7/2002

OTHER PUBLICATIONS

Lukas et al., "Resources, Conservation & Recycling. Overview and Description of Technologies for Recovering Phosphorus from Municipal Wastewater", vol. 105, Nr Part B, pp. 325-346, 2015.
(Continued)

*Primary Examiner* — Chester T Barry
(74) *Attorney, Agent, or Firm* — Moser Taboada (57) ABSTRACT

The present invention concerns a process for recovering phosphates from wastewater by adding to the wastewater at least one organic coagulant or polymer in a mechanical treatment step that leaves dissolved phosphorus in the water phase, separating a mechanical sludge from the treated wastewater, preferably by sedimentation, flotation or filtration, carrying the phosphorus-containing treated wastewater in a post-treatment step, where at least one chemical precipitant is added to precipitate the dissolved phosphate into solid phosphates, and separating the solid phosphates from the treated wastewater to recover the phosphates.

9 Claims, 4 Drawing Sheets

(51) Int. Cl.
*C05F 7/00* (2006.01)
*C05B 7/00* (2006.01)
*C02F 1/24* (2006.01)
*C02F 1/52* (2006.01)
*C02F 1/56* (2006.01)
*C02F 3/12* (2006.01)
*C02F 11/04* (2006.01)
*C02F 101/10* (2006.01)
*C02F 11/12* (2019.01)
*C02F 1/00* (2006.01)

(52) U.S. Cl.
CPC .............. *C05F 7/005* (2013.01); *C02F 1/001* (2013.01); *C02F 1/004* (2013.01); *C02F 1/24* (2013.01); *C02F 1/5236* (2013.01); *C02F 1/5245* (2013.01); *C02F 1/5254* (2013.01); *C02F 1/56* (2013.01); *C02F 3/12* (2013.01); *C02F 11/04* (2013.01); *C02F 11/12* (2013.01); *C02F 2001/007* (2013.01); *C02F 2001/5218* (2013.01); *C02F 2101/105* (2013.01); *Y02A 40/213* (2018.01); *Y02W 10/15* (2015.05); *Y02W 30/47* (2015.05)

(56) References Cited

U.S. PATENT DOCUMENTS

2015/0360983 A1 12/2015 Murkute et al.
2016/0369261 A1* 12/2016 Razavi-Shirazi ....... C02F 3/303

OTHER PUBLICATIONS

Finnish Search Report and Office Action dated Jul. 7, 2016 for Patent Application No. 20155977.
International Search Report dated Apr. 7, 2017 for PCT Application No. PCT/EP2016/082147.

* cited by examiner

RECOVERY OF PHOSPHORUS COMPOUNDS FROM WASTEWATER

FIELD OF THE INVENTION

The present invention relates to recovering phosphorus from wastewater in a simple and efficient way in a combined chemical and biological wastewater treatment plant (WWTP).

BACKGROUND

Municipal wastewater contains a lot of different substances. The most commonly used parameters comprise biochemical oxygen demand (BOD), suspended solids (SS), phosphorus (P) and nitrogen (N). These parameters are typically regulated by authorities.

Municipal wastewater treatment processes typically include several steps, all designed to provide water that is sufficiently clean for returning to water streams. These process steps may include

- mechanical, optionally with added inorganic chemical, designed to separate suspended solids and possibly phosphorus from raw sewage for example in sedimentation basins,
- biological, designed to consume organic matter using microbes, preferably followed by a further sedimentation step designed to further separate suspended solids, and
- nutrient removal, which can be a part of the biological process or done by chemical treatment.

In the mechanical treatment, typically about 30% of the BOD and 50-60% of the SS is removed and very little of P and N. In many cases this is not enough and a chemical is introduced to improve the separation. The chemical added may be an iron or aluminium salt. These salts are normally called coagulants or inorganic coagulants and will support the particle, BOD and phosphorus removal. Up to 95% of SS and 75% of BOD can be reduced if a coagulant is added to the process simultaneously with the mechanical treatment. Since iron and aluminium also precipitate phosphorus, dissolved phosphorus from the wastewater is also separated when inorganic coagulants are used. Up to 98% P can be reduced. In some cases a chemical enhanced primary treatment (CEPT) is enough to fulfil the wastewater effluent standard. In that case this process is described as a CEPT plant or a direct precipitation plant.

In the biological treatment, remaining SS and BOD is removed. In this step natural bacteria degrades organic substances to biomass, carbon dioxide and water. This is normally done under aerobic conditions where oxygen is added to the water to increase the efficiency, for example in an activated sludge process. Biological treatment can be completed by simultaneous phosphorus reduction process in which chemical phosphorus precipitation takes place at the same time as biological treatment in an activated sludge process. The biological stage also serves as a coagulation basin, and both the biological sludge and the chemical sludge are removed in the subsequent stage. The coagulants that are normally used for simultaneous precipitation are aluminium salts or iron salts.

The above described combined chemical and biological wastewater treatment plant is efficient in reducing the amounts of suspended solids, biodegradable organics, and nutrients, including nitrogen and phosphorus. However, particularly in the case of the nutrients, there is still a need for a process that will recover these nutrients efficiently, while still reducing the amounts of suspended solids and organics, whereby said nutrients can be separated, recycled and reused.

Wastewaters may contain phosphorus in the form of orthophosphates, organic bound phosphorus and polyphosphates. The concentrations of phosphorus in municipal wastewaters may typically be for example 3-20 mg/l, but also much higher concentrations are possible. Some industrial wastewaters may contain 100 mg/l or even higher amounts of phosphorus.

The removal of phosphorus from wastewaters is an essential step of wastewater treatment, due to the role that phosphorus has in eutrophication. Phosphorus removal is therefore typically regulated by authorities.

Phosphorus in wastewater exists in particulate and dissolved matter. The dissolved matter mainly consists of phosphates. In a WWTP, it is therefore essential to remove both particulate and dissolved P and this can be done in different ways by chemical or biological means.

Chemicals for phosphorus removal, such as inorganic coagulants, can be applied in different parts of a WWTP. Phosphorus can be separated from wastewater in a direct precipitation plant with no further treatment. Phosphorus can also be precipitated in an activated sludge tank. This process is called simultaneous precipitation or co-precipitation. The precipitated phosphorus remains mixed with the sludge.

Biological phosphorus removal may be done by two different means, assimilation and enhanced biological phosphorus removal. Assimilation is the uptake of phosphorus in the biomass. This is done in all living organisms but the amount of phosphorus that is taken up is not so high. Only about 1% of the biomass is phosphorus. So with more biomass production in biological treatment more phosphorus can be taken up. With chemical pre-treatment it is possible to control the BOD load to the biological treatment. With a high BOD load more phosphorus can be assimilated and vice versa.

Enhanced biological phosphorus removal (EBPR) is an activated sludge process where bacteria with higher potential to take up phosphorus are encouraged to grow. In this process the bacteria both release and take up phosphorus. Under anaerobic conditions phosphorus is released and under aerobic phosphorus is taken up. This means that if the biological sludge is anaerobically digested to produce biogas, some phosphate is released. This phosphate release can cause scaling problems in the digester and the dewatering system after the digester but can also open up for recovery of some phosphorus. EBPR processes are not as efficient and stable as chemical phosphorus removal process and are normally backed up with a chemical process to ensure that effluent requirements are fulfilled.

Chemical phosphorus removal has a high efficiency of removing phosphorus from wastewater and precipitating it into the sludge. It can then be recycled to the agricultural land with the sludge and used as a nutrient. On the other hand, the biological phosphorus removal process is less efficient and the wastewater contains typically higher amounts of phosphorus. However, phosphorus can be recovered in the side stream after the anaerobic digestion that can release phosphorus. This is, however, an internal recycle stream at the plant with low phosphorus removal efficiency and only small portion of phosphorus is recovered i.e. 5-30% of the influent phosphorus.

There is still a need for improved procedures that efficiently concentrate and separate the phosphorus compounds, so that they can be efficiently recovered for further use.

SUMMARY OF THE INVENTION

It is an object of the present invention to provide a process for efficiently recovering phosphorus from wastewaters.

Particularly, it is an object of the present invention to provide a process, wherein the phosphorus can be separated from the wastewater and sludge in concentrated form and then utilized as a raw material or used as such.

These and other objects, together with the advantages thereof over known processes, are achieved by the present invention, as hereinafter described and claimed.

Thus, the present invention concerns a process for recovering the phosphates from wastewaters.

More specifically, the process of the present invention is characterized by what is claimed in the appended claims.

In the present process, a maximum amount of phosphorus is kept as dissolved phosphorus in the water phase through a wastewater treatment process until a post-treatment step. The dissolved phosphorus may include phosphates, and preferably is mainly phosphates. At the post-treatment the dissolved phosphates are precipitated to solid phosphates. Thus, the dissolved phosphorus can be precipitated from the wastewater and the resulting solid phosphates separated in concentrated form from the wastewater in the post-treatment step with a high purity since most of the other impurities have been removed from the water in the previous steps. Other phosphorus removal techniques may also be used, such as adsorption or ion exchange. This recovery can be done efficiently, since the interfering biomass has already been removed and because phosphorus is recovered from the main stream, not from a cycle.

The solid phosphates that are precipitated and separated from the wastewater according to the present invention form a product with a low organic content and can be used as such, or can optionally be further processed after separation, for example in a centralized upgrading plant into a fertilizer raw material.

Considerable advantages are thus obtained by means of the invention. The estimated phosphorus recovery rate in the present process is 30-70%, e.g. 50-70%, of the influent phosphorus. This recovered phosphorus is obtained in a sufficiently pure form for further utilization, even without additional purification steps and it contains less heavy metals and persistent organic pollutants than regular dewatered sewage sludge.

As the phosphorus is separated from water, and not precipitated into the sludge, a further advantage can be obtained, since the sludge volumes of the procedure can be reduced. This, in turn, also results in a more efficient recovery of the phosphorus compounds. Lower sludge volumes result also in decreased need of sludge treatment or disposal. Furthermore, separating phosphorus from water is much easier and less energy consuming than when separating it from the sludge or even after sludge treatment processes, such as incineration and separation from ash with high chemical consumption, such as in extraction.

Next, the invention will be described more closely with reference to the attached drawings and a detailed description.

DETAILED DESCRIPTION OF EMBODIMENTS OF THE INVENTION

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

Thus, embodiments of the invention are described with reference to municipal WWTPs. In other embodiments of the invention, industrial wastewaters or other wastewaters containing phosphorus may be processed. An industrial WWTP has a similar design to municipal WWTPs and embodiments described in relation to municipal WWTPs are applicable also in relation to industrial WWTPs.

In embodiments of the invention, typically a majority of the phosphorus in the influent wastewater is reused without impacting the potential advantages of a combined chemical and biological WWTP and without increasing energy consumption, lowering biogas production or requiring high investments. Embodiments of the invention provide a simple process that is easily implementable in most WWTPs.

Figure 1:
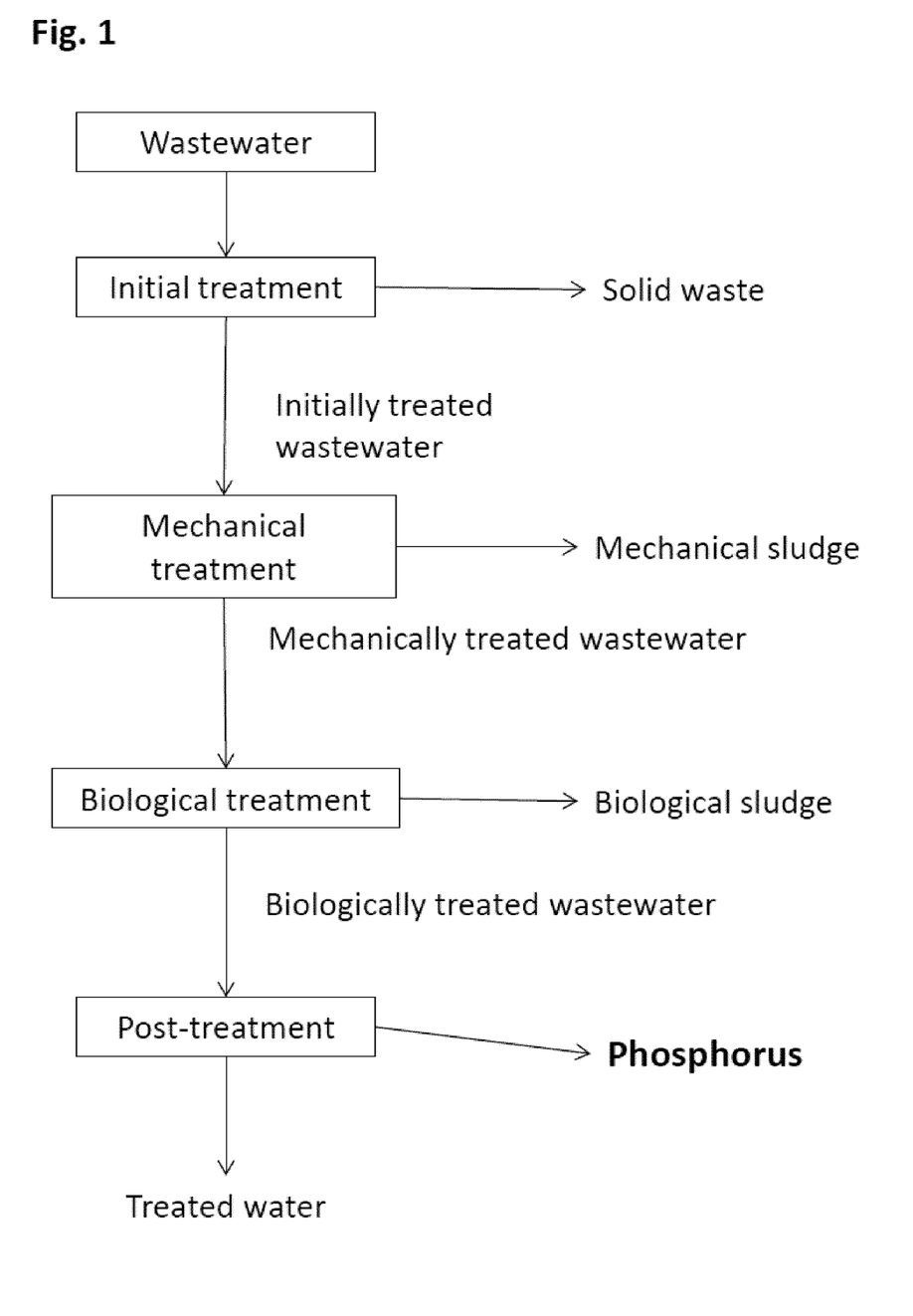
FIG. 1 is a schematic drawing of the process scheme used in an embodiment of the present invention.

Municipal wastewater may be treated in a step-wise process as described in the following example embodiment, including an initial treatment step, a mechanical treatment step, a biological treatment step and a post-treatment step (see FIG. 1).

According to this embodiment, wastewater is screened and/or filtered, whereby large particles, particularly particles of a size >3 mm, debris and other solid material are separated. Water then passes a sand trap where a bit smaller particles like sand and grounded coffee are separated in an aerated tank. The separated waste from these initial steps may be disposed or incinerated since it typically has very low recycling value.

In the next step of the wastewater treatment according to this embodiment, smaller particles are separated from the wastewater obtained from the initial step in sedimentation basins. The particles removed in this mechanical treatment step end up in a mechanical sludge. Typically, about 30% of the BOD and 50-60% of the SS is removed and very little of P and N.

In embodiments of the invention, the target is to keep as much phosphorus as possible in the water. The wastewater is treated in the mechanical treatment step with very small amount or preferably with no inorganic coagulants at all. The target is to utilize the positive impact of the mechanical treatment and achieve a reduced BOD load to the biological treatment, and hence lower energy consumption, as well as a higher mechanical sludge production so that biogas production is as high as possible. This is done by utilizing an organic coagulant or a polymer, suitable ones may be selected from polyacrylamide, melamine formaldehydes, polyamine, polyDADMAC, natural polymers like tannins and lignin, natural polysaccharides like starch, cellulose, hemicellulose alginate, guar gum, chitine and chitosan, and cationic or anionic derivatives thereof, and any combination thereof, preferably polyacrylamide, polyamine and polyDADMAC. In this embodiment, particle removal is at least on the same level as, preferably better than, with conventional mechanical treatment but the dissolved phosphorus is kept in the wastewater.

The mechanically treated wastewater with a higher than normal dissolved phosphate content is then, according to an embodiment treated in a biological treatment step. Activated sludge process is preferred, but also other biological treatment processes can be used. Some phosphorus is assimilated in the biological treatment step. In accordance with embodiments of the invention, the amount of BOD entering the biological treatment can be controlled and therefore, it is also possible to control how much phosphorus is assimilated. The target is to keep the phosphorus in the wastewater until a post-treatment step, whereby it is preferred to remove as much BOD as possible in the mechanical and biological treatment steps and at the same time avoid unnecessary phosphorus removal in these steps.

In this biological treatment step, bacteria degrade organic substances in the wastewater to biomass, carbon dioxide and water. The biomass can then be separated from the treated wastewater, as a biological sludge, thus reducing BOD. This may be done under aerobic, oxygen rich conditions where oxygen is added to the wastewater to increase the efficiency. Since bacteria are slow growing they must be kept in the treatment process longer time than the wastewater that is treated. This can be done in several ways, for example with activated sludge process where bacteria live in a bioreactor in a high concentration. After the bioreactor, bacteria that are discharged into sedimentation basin together with the treated wastewater are separated and can be recycled to the bioreactor again. The sedimentation tank may be replaced by a membrane filter. In that case the activated sludge tank is called a membrane bioreactor. Alternatively, bacteria can grow on carrier material in filters, such as trickling filters, or in bioreactors, such as moving bed bioreactor. In that case bacteria are not recycled to the bioreactor after treatment. In the biological treatment BOD may be removed to a large extent. Normally more than 90% is removed.

In one embodiment of the invention, the lack of nutrients is not limiting the performance of the biological treatment step as phosphorus is not recovered and separated prior the biological step. There will be enough phosphorus available for BOD and nitrogen removal without lowering their removal efficiencies. Also when most of the organics are removed before the biological step, the bacteria need less phosphorus as less organic is present, therefore the least amount of phosphorus is consumed and bound and most of the dissolved phosphates are still remaining in water phase until the phosphorus separation step in the post-treatment. Furthermore, the sludge age, i.e. the time that the biomass spends in this step can easily be controlled and lengthened which further increases the amount of dissolved phosphates in water phase and provides even more phosphorus to be recovered in the phosphorus separation step.

Compared with WWTPs operating without direct or pre-precipitation, embodiments of the invention may provide energy savings due to lower need for aeration, and a much lower demand for treatment volumes. Therefore, the biological process in the biological treatment step can be more compact and less energy demanding. This provides also a lower capital and operational cost than most existing biological treatment plants. As an alternative, the treatment capacity can be increased in existing biological treatment.

After the biological treatment step, BOD and SS levels of the remaining treated wastewater are low. At this stage, the wastewater can be further purified, as long as the phosphorus remains in the wastewater. Nitrogen levels can be low depending on configuration of the plant. However, the nitrogen level typically has no influence in the phosphorus separation.

In embodiments of the invention, phosphorus is separated from the treated wastewater in a post-treatment step. In a preferred embodiment, the dissolved phosphorus is precipitated by chemical means, since almost all the dissolved phosphorus will be present as phosphate. The present process is able to influence inorganic phosphorus in the wastewaters, such as phosphates. The dissolved phosphorus present as phosphates is preferably precipitated using at least one chemical precipitant. Solid phosphates are obtained from such a chemical treatment. Examples of suitable chemical precipitants are salts of iron (ferric or ferrous), aluminium, calcium or magnesium that may be used to separate the dissolved phosphorus. Suitable salts include for example calcium hydroxide, calcium oxide, calcium chloride, calcium sulphate, magnesium chloride, magnesium sulphate, magnesium oxide, magnesium hydroxide, aluminium sulphate, aluminium chloride, polyaluminium chloride, polyaluminium sulphate, polyaluminium nitrate, aluminium chlorohydrate, aluminium hydroxide, sodium aluminate, ferric chloride, ferric sulphate, ferric chloro sulphate, ferrous chloride, ferrous sulphate, ferrous chloro sulphate, ferric hydroxide, ferrous hydroxide or sodium hydroxide. These precipitates are then separated from the treated wastewater by a physical separation, i.e. which uses physical means, for example by sedimentation, flotation, centrifugation or filtration. The physical separation may be performed using a decanter centrifuge, disk filter, chamber filter press, and/or hydrocyclone. Also other phosphorus removal technologies may also be used in the post-treatment, like chemical-physical separations methods, may be used, such as ion exchange or adsorption to separate the dissolved phosphorus from the treated wastewater. It is to be noted that the precipitate separation may be carried out using multiple separation steps. These separations steps may include one or more separation devices, e.g. as mentioned above, in any combination.

The phosphorus precipitate obtained after the post-treatment step typically has a low content of other contaminants and a much higher concentration of phosphorus than conventional wastewater sludges. The phosphorus precipitate obtained with embodiments of the invention is suitable to be used as a phosphorus source for direct or indirect reuse of phosphorus, such as direct use as a fertilizer or for further processing or refining.

Figure 2:
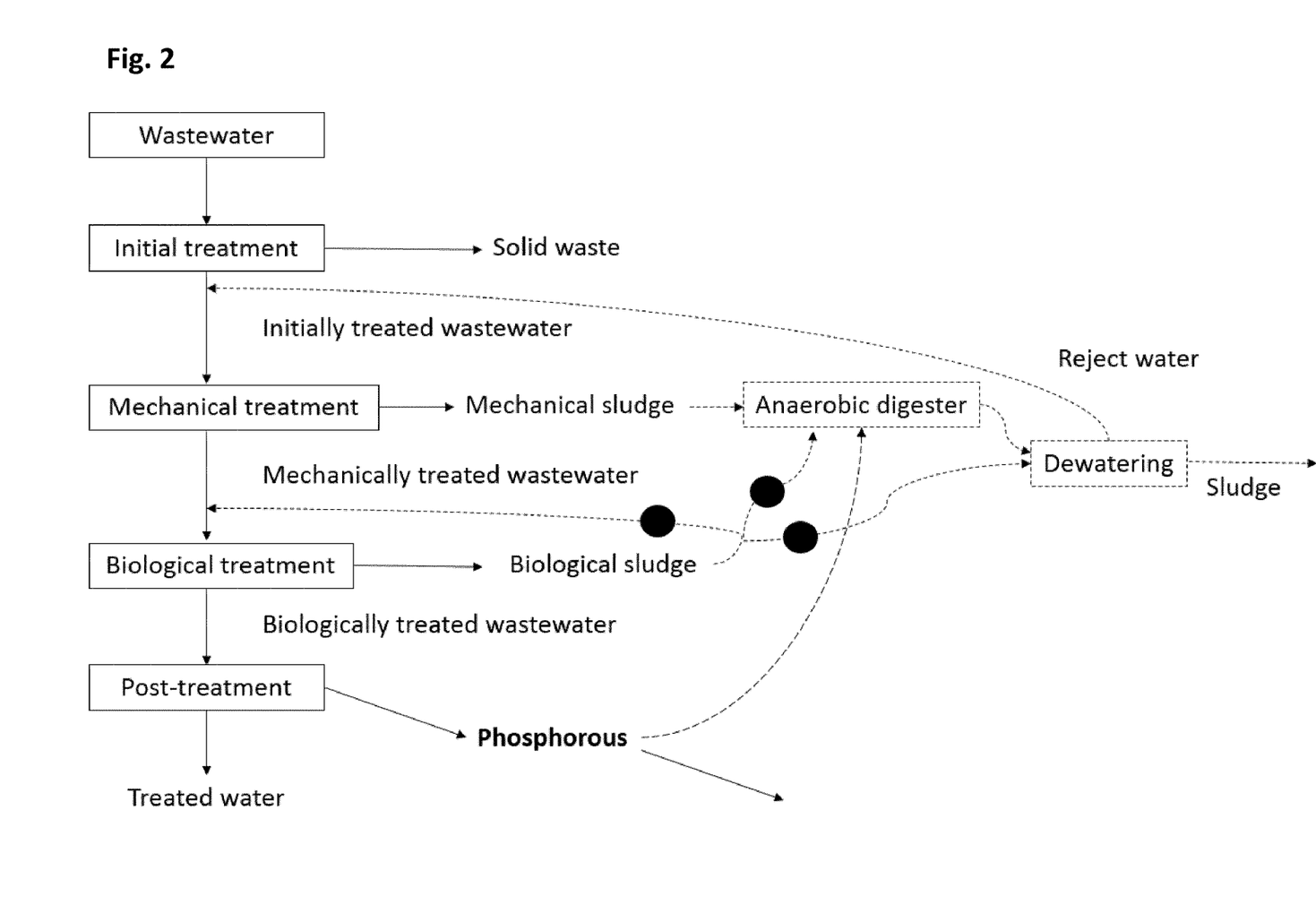
FIG. 2 is a schematic drawing of the process scheme used in another embodiment of the present invention.

To achieve as high phosphorus recovery yield as possible it is preferred to further process the mechanical and/or biological sludges (see FIG. 2). In a preferred embodiment, sludges are anaerobically digested. Digested sludges may be dewatered and reject may be forwarded back to the process before the mechanical treatment. Then sludge volumes are reduced and some of the particulate bound phosphorus is released and can be recycled to a step of the wastewater treatment process that is before the post-treatment where the phosphorus is separated. Released phosphorus ends up in the water and can be separated after the biological treatment.

In one embodiment the phosphate precipitate may be recycled back to preceding process steps, such as an anaerobic digestion. A small portion of the phosphorus precipitate (i.e. the phosphate containing precipitate) from the post-treatment can be returned to an anaerobic digestion when ferric or ferrous compounds are used in precipitation. When the returned iron amount is optimised with the hydrogen sulphide content that is typically formed in the anaerobic digestion it is possible to bind and precipitate that sulphide with the recycled iron that is released from the precipitate of phosphate. Binding the sulphide with iron will have double advantages in the anaerobic digestion as it will further increase the biogas yield due to removal of hydrogen sulphide, and at the same time it will release the phosphate again into the liquid phase which can then be recycled back to the mechanical separation or biological treatment step or to the post-treatment to be recovered and separated again in the post-treatment step. Therefore, phosphate is not lost but iron is utilized also in an anaerobic digestion.

To further increase the release of phosphorus from the biological treatment step, it is possible to process the return sludge or a side stream of the returns sludge, from the biological sedimentation and treat that separately before it is returned to bioreactor or forwarded to a dewatering step. Such additional processing steps are shown in FIG. 2 as black circles. By doing that, biological sludge volumes decrease and less phosphorus can be bound into the biomass. This can be done by biological, chemical or physical means or a combination of these. Examples of suitable means are biological treatment in anaerobic, anoxic, micro-aerofilic or aerobic treatment, chemical treatment with ozone, hydrogen peroxide, performic acid, or other strong chemical oxidants or reactants and by physical mean with for instance ultra sound, micro-screening and other physical processes.

Anaerobic digestion of the sludge may produce methane gas. In a further embodiment, the methane gas is utilized for production of energy, whereby the carbon footprint of the process may be reduced.

In an embodiment of the invention, sludge volumes are minimized and a portion of the phosphorus is released from the sludge by aerobic treatment or chemical physical means. However, this will not generate methane production, as does the anaerobic sludge treatment. This released phosphorus can then be returned to the water in the biological treatment.

In the embodiments described above, a recovery rate for phosphorus can be achieved that is as high as 70% of the influent phosphorus. This is much higher than what would be possible with a conventional WWTP or with an enhanced biological phosphorus removal process.

Figure 3:
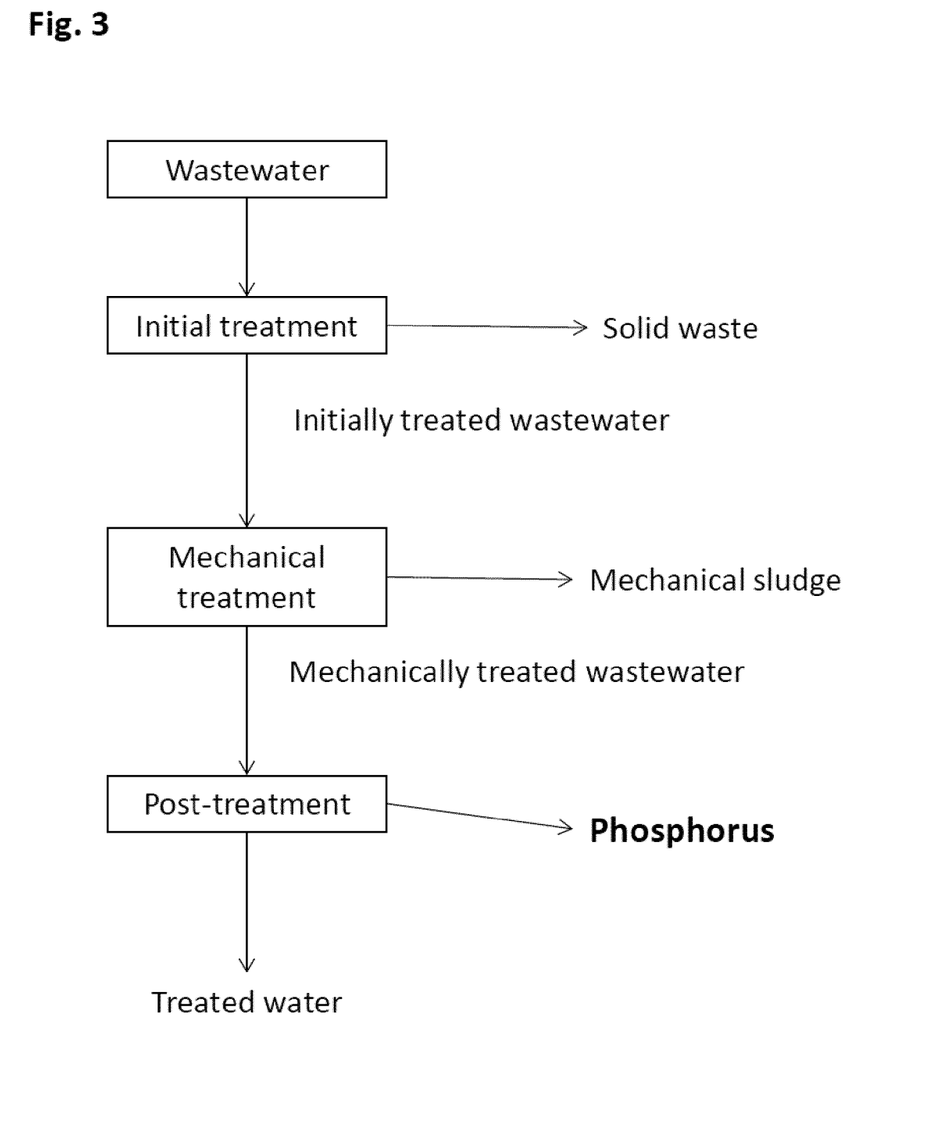
FIG. 3 is a schematic drawing of the process scheme used in a third embodiment of the present invention.

In an embodiment of the invention, the same concept described above is applied in direct precipitation (see FIG. 3), which is done with an organic coagulant or a polymer, such as polyacrylamide, melamine formaldehydes, tannins, polyamine and polyDADMAC, preferably polyDADMAC, polyamine or polyacrylamide, so that as much phosphorus as possible is kept in the wastewaters. A phosphate separation step is added as a final treatment where phosphorus is precipitated and separated in the same way as described above for the post-treatment step. The recovery rate of phosphorus is close to the same level as in the process of the above described embodiments. The phosphorus precipitate obtained in this latter embodiment may contain some residuals of dissolved substances, but can be used as phosphorus raw material for further processing. Also in this embodiment, processing of the sludge can increase the recovery rate since reduced sludge volumes can mean a release of some of the particulate phosphorus.

Figure 4:
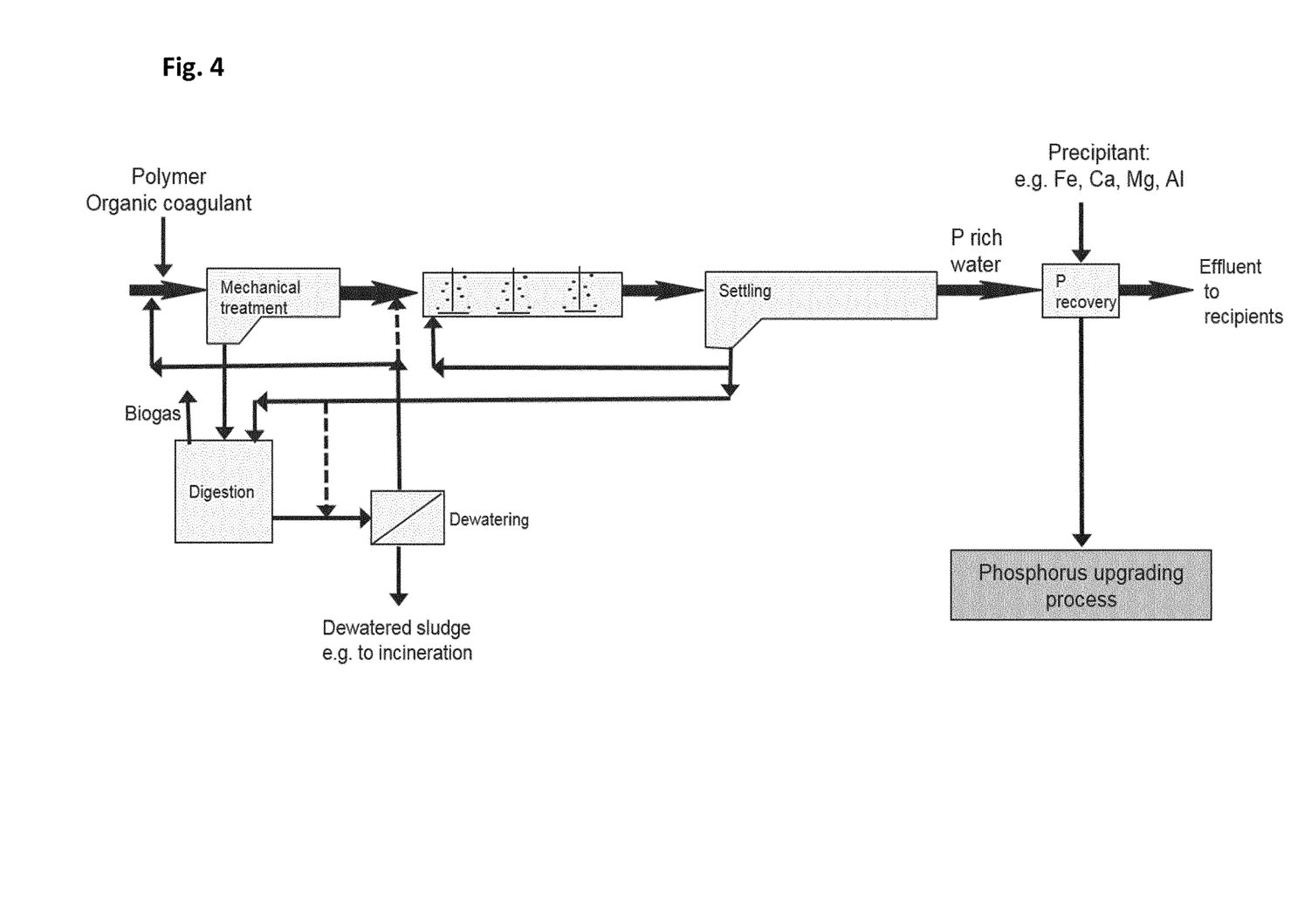
FIG. 4 is a schematic drawing of a detailed process scheme used in an embodiment of the present invention.

In a further embodiment of the invention, the above described sludges are all treated to recirculate an additional amount of phosphorus back to the process (see FIG. 4). The mechanical sludge is subjected to an anaerobic digestion. Then the sludge volume is reduced and some of the particulate bound phosphorus is released and recycled to the process. A portion of the biological sludge, mainly consisting of biomass, can be returned to the biological treatment step for reutilization, whereby also any phosphorus remaining in the biomass can be extracted therefrom.

Even though phosphorus recovery is an important part of the invention it is needed to point out that there are other advantages with the process compared with conventional wastewater treatment processes. With an improved particle separation in the mechanical treatment step the biogas production in the anaerobic digester is improved dramatically. It can in extreme cases be doubled compared with other wastewater treatment process like biological enhanced phosphorus removal process. On top of that, the efficient reduction of particles also unload the biological treatment step and save energy in that unit operation.

Fertilizers or fertilizer raw materials comprising a phosphate may be obtained by the present process. A phosphate obtained by the present process may be used as a fertilizer or fertilizer raw material or may be used in the production of a fertilizer or fertilizer raw material.

The following non-limiting examples are intended merely to illustrate the advantages obtained with the embodiments of the present invention.

EXAMPLES

Example 1

Separation of the Mechanical Sludge Using Polyacrylamide (PAM), Polyamine (PA) and Poly-DADMAC Flocculants (p-D), and Conventional Inorganic Coagulants Ferric Chloride (PIX) and Polyaluminium Chloride (PAX)

a) Incoming wastewater to the wastewater treatment plant was taken from the process. Dry solids content was 0.05%. Flocculant solution were prepared dissolving the dry polymers (100% active agent) to 0.1% active agent solutions and polymer solutions to 5% active agent concentrations. 900 g of that incoming wastewater was taken into a beaker. A motor mixer was placed in the beaker and turned on at the speed of 200 rpm. The mixing at this speed was continued for 30 seconds, during which the flocculant solution was added into the well mixing solution using a pipette. Then the stirring was slowed down to 40 rpm and continued stirring at this speed for 5 min. After this the stirring was stopped and formed flocs were let to settle for 10 min, after which the sampling was done in the depth of 3 cm.

TABLE 1

Separation of the mechanical sludge using PAM.

| Flocculant polymer | % active agent in solution | Dosage (μl) | pH | Turbidity (NTU) | P-tot settled (mgP/l) | Ortho-P settled and filtrated (mgP/l) | COD settled (mg/l) | SCOD settled and filtrated (mg/l) |
|---|---|---|---|---|---|---|---|---|
| Incoming wastewater, not settled | | 0 | 7.8 | 80 | 5.7* | 4.1* | 314* | 82* |
| zero1, settled | | 0 | 7.8 | 39 | 4.6 | 3.1 | 145 | 78 |
| C491 (PAM) | 0.1 | 4500 | 7.7 | 19 | 3.7 | 3.0 | 92 | 69 |
| C492 (PAM) | 0.1 | 3600 | 7.7 | 19 | 3.7 | 3.0 | 90 | 65 |
| C494 (PAM) | 0.1 | 4500 | 7.6 | 18 | 3.7 | 3.0 | 80 | 63 |
| C498 (PAM) | 0.1 | 450 | 7.6 | 22 | 4.1 | 3.2 | 101 | 69 |
| C498 (PAM) | 0.1 | 900 | 7.5 | 18 | 3.9 | 3.1 | 90 | 68 |
| C498 (PAM) | 0.1 | 1800 | 7.5 | 16 | 3.9 | 3.2 | 82 | 66 |
| C498 (PAM) | 0.1 | 2700 | 7.6 | 15 | 3.7 | 3.1 | 78 | 60 |
| C498 (PAM) | 0.1 | 3600 | 7.5 | 14 | 3.7 | 3.1 | 76 | 63 |
| C498 (PAM) | 0.1 | 4500 | 7.5 | 15 | 3.6 | 3.1 | 71 | 56 |

*not settled.

TABLE 2

Separation of the mechanical sludge using poly-DADMAC.

| Flocculant polymer | % active agent in solution | Dosage (μl) | pH | Turbidity (NTU) | P-tot settled (mgP/l) | Ortho-P settled and filtrated (mgP/l) | COD settled (mg/l) | SCOD settled and filtrated (mg/l) |
|---|---|---|---|---|---|---|---|---|
| Incoming wastewater, not settled | | 0 | 7.8 | 130 | 8.5* | 4.1* | 517* | 120* |
| Zero2 | | 0 | 7.8 | 68 | 6.7 | 4.2 | 255 | 138 |
| C591 (p-D) | 5 | 216 | 7.8 | 36 | 4.9 | 4.3 | 215 | 101 |

*not settled.

b) Incoming wastewater to the wastewater treatment plant was taken from the process. Dry solids content was 0.07%. Flocculant solution were prepared dissolving the dry polymers (100% active agent) to 0.1% active agent solutions and polymer solutions to 5% active agent concentrations. 1000 g of that incoming wastewater was taken into a beaker. A motor mixer was placed in the beaker and turned on at the speed of 200 rpm. The mixing at this speed was continued for 30 seconds, in the beginning of which the flocculant solution was added into the well mixing solution using a pipette. Then the stirring was slowed down to 40 rpm and continued stirring at this speed for 5 min. After this the stirring was stopped and formed flocs were let to settle for 10 min, after which the sampling was done in the depth of 3 cm.

TABLE 3

Separation of the mechanical sludge using PAM, polyamine and poly-DADMAC.

| Flocculant polymer | % active agent in solution | Dosage (μl) | pH | Turbidity (NTU) | P-tot settled (mgP/l) | Ortho-P settled and filtrated (mgP/l) |
|---|---|---|---|---|---|---|
| Incoming wastewater, not settled | | 0 | | 172 | 9.7* | 7.1* |
| zero1, settled | | 0 | 7.7 | 80 | 9.5 | 7.2 |
| C492 (PAM) | 0.1 | 3000 | 7.7 | 33 | 7.8 | 7.1 |
| C492 (PAM) | 0.1 | 4000 | 7.6 | 28 | 7.9 | 7.1 |
| C492 (PAM) | 0.1 | 5000 | 7.7 | 26 | 7.6 | 7.1 |
| C492 (PAM) | 0.1 | 7000 | 7.7 | 28 | 7.6 | 7.1 |
| C494 (PAM) | 0.1 | 3000 | 7.7 | 34 | 7.9 | 7.1 |
| C494 (PAM) | 0.1 | 4000 | 7.7 | 30 | 8.2 | 7.1 |
| C494 (PAM) | 0.1 | 5000 | 7.7 | 27 | 7.6 | 7.1 |
| C498 (PAM) | 0.1 | 3000 | 7.7 | 35 | 8.1 | 7.2 |
| C498 (PAM) | 0.1 | 4000 | 7.7 | 31 | 8.6 | 7.2 |
| C498 (PAM) | 0.1 | 5000 | 7.7 | 28 | 8.2 | 7.2 |
| C498 (PAM) | 0.1 | 7000 | 7.7 | 27 | 7.8 | 7.2 |
| Zero3, settled | | 0 | 7.6 | 74 | 9.4 | 7.1 |
| C581 (PA) | 5 | 160 | 7.6 | 52 | 9.1 | 6.9 |
| C581 (PA) | 5 | 240 | 7.6 | 41 | 7.1 | 7.2 |

TABLE 3-continued

Separation of the mechanical sludge using PAM, polyamine and poly-DADMAC.

| Flocculant polymer | % active agent in solution | Dosage (μl) | pH | Turbidity (NTU) | P-tot settled (mgP/l) | Ortho-P settled and filtrated (mgP/l) |
|---|---|---|---|---|---|---|
| C591 (p-D) | 5 | 80 | 7.6 | 60 | 8.3 | 7.1 |
| C591 (p-D) | 5 | 120 | 7.6 | 48 | 8.3 | 7.3 |
| C591 (p-D) | 5 | 160 | 7.6 | 30 | 7.1 | 7.2 |
| C591 (p-D) | 5 | 240 | 7.6 | 34 | 7.7 | 7.3 |
| C592 (p-D) | 5 | 80 | 7.6 | 57 | 9.1 | 7.1 |
| C592 (p-D) | 5 | 120 | 7.6 | 37 | 8.1 | 7.3 |
| C592 (p-D) | 5 | 160 | 7.6 | 32 | 7.3 | 7.2 |
| C592 (p-D) | 5 | 240 | 7.6 | 35 | 7.1 | 7.2 |

*not settled.

c) Incoming wastewater to the wastewater treatment plant was taken from the process. Suspended solids content was 0.05%. 1000 g of that incoming wastewater was taken into a beaker. A motor mixer was placed in the beaker and turned on at the speed of 400 rpm. The mixing at this speed was continued for 10 seconds, during which the inorganic coagulant was added into the well mixing solution using a pipette. The used inorganic coagulants were PIX-111 (Fe 13.8%, density 1.42 g/ml), PAX-XL9 (Al 4.5%, density 1.2 g/ml), and PAX-XL-19 (Al 12.5%, density 1.35 g/ml). Then the stirring was slowed down to 40 rpm and continued stirring at this speed for 5 min. After this the stirring was stopped and formed flocs were let to settle for 10 min, after which the sampling was done in the depth of 3 cm.

TABLE 4

Separation of the mechanical sludge using ferric and aluminium coagulants.

| Sample | Dosage (μl) | pH | Turbidity (NTU) | P-tot settled (mgP/l) | Ortho-P settled and filtrated (mgP/l) |
|---|---|---|---|---|---|
| Incoming wastewater, not settled | 0 | | 120 | 7.8* | 4.6* |
| zero1, settled | 0 | 8.0 | 62 | 6.6 | 4.6 |
| PAX-XL9 | 37 | 8.0 | 54 | 5.6 | 4.2 |
| PAX-XL9 | 74.1 | 7.9 | 25 | 5.3 | 3.9 |
| PAX-XL9 | 148.1 | 7.9 | 7.4 | 2.6 | 3.3 |
| PAX-XL9 | 203.7 | 7.9 | 4.2 | 1.7 | 2.8 |
| PAX-XL-19 | 11.9 | 7.8 | 35 | 5.8 | 3.9 |
| PAX-XL-19 | 23.7 | 7.7 | 12 | 4.6 | 3.3 |
| PAX-XL-19 | 47.4 | 7.6 | 4.0 | 3.6 | 2.1 |
| PAX-XL-19 | 65.2 | 7.5 | 2.0 | 3.5 | 1.4 |
| PIX-111 | 21.1 | 7.7 | 58 | 5.5 | 3.0 |
| PIX-111 | 42.2 | 7.5 | 35 | 4.5 | 1.8 |
| PIX-111 | 63.4 | 7.3 | 24 | 3.5 | 0.9 |
| PIX-111 | 84.5 | 7.2 | 17 | 2.2 | 0.3 |

*not settled.

Example 2

Phosphorus Recovery in the Post-treatment

The phosphorus recovery in the post-treatment was simulated in the laboratory scale using wastewater from a wastewater treatment plant having a biological treatment process. As the wastewater treatment practises today require the removal of phosphorus, the total phosphorus in the wastewater was reduced to meet these requirements at the plant. Thus phosphorus level was raised to the desired level using $Na_3PO_4$ in order to simulate the phosphorus recovery according to the invention.

a) Precipitation Using Ferric Coagulant 20 liters of wastewater with total phosphorus of 0.33 mg/l was taken from the process. 529.0 mg of $Na_3PO_4$ was added to raise the phosphorus level to 5 mgP/l. 1000 ml of so prepared phosphorus rich wastewater was taken into a beaker. A motor mixer was turned on at the speed of 400 rpm. Immediately after starting the mixing, the desired dosage of Fe-coagulant PIX-111 (Fe 13.7%, density 1.44 g/ml) for precipitating phosphorus using a pipette was added. The vigorous 400 rpm stirring was continued for 30 seconds, and then it was slowed down to 40 rpm for 10 minutes. The stirring was stopped and the sample was let settle for 10 min. The phosphorus precipitate separated into the bottom of the beaker. The sample was taken at 3 cm depth from the top of the liquid surface. The phosphorus precipitate formation was identified by analysing the liquid phase which inversely tells the removal of phosphorus from the liquid and the formation of phosphorus precipitate.

TABLE 5

| Sample | P-tot before treatment (mgP/l) | PIX-111 (μl) | pH initial | pH after PIX-111 addition | Turbidity (NTU) | Ortho-P (mg/l) settled |
|---|---|---|---|---|---|---|
| 0 wastewater | 0.33 | 0 | 7.0 | | 4.32 | |
| 1 wastewater with added P | 4.79 | 0 | | | | |
| 29 | 4.79 | 43.9 | | 6.6 | 1.20 | 0.989 |

TABLE 5-continued

| Sample | P-tot before treatment (mgP/l) | PIX-111 (μl) | pH initial | pH after PIX-111 addition | Turbidity (NTU) | Ortho-P (mg/l) settled |
|---|---|---|---|---|---|---|
| 30 | 4.79 | 48.2 | | 6.5 | 1.54 | 0.653 |
| 31 | 4.79 | 52.6 | | 6.4 | 1.16 | 0.552 |
| 32 | 4.79 | 57.0 | | 6.4 | 0.93 | 0.342 |
| 33 | 4.79 | 61.4 | | 6.4 | 1.33 | 0.322 |
| 34 | 4.79 | 65.8 | | 6.3 | 1.02 | 0.147 | b) Precipitation Using $CaCl_2$ and NaOH 4999.87 grams of wastewater with total phosphorus of 0.43 mg/l and dissolved ortho phosphorus of 0.20 mg/l was taken from the process. 132.3 mg of $Na_3PO_4$ was added to raise the phosphorus level to 5 mgP/l. 900 g of so prepared phosphorus rich wastewater was taken into a beaker. A motor mixer was turned on at the speed of 400 rpm. pH was adjusted to the desired level using 20% NaOH. The desired dosage of $CaCl_2$-solution having 9.77% Ca was added using a pipette for precipitating phosphorus. The vigorous 400 rpm stirring was continued for 10 seconds counted from the beginning of $CaCl_2$-solution addition, after which it was slowed down to 99 rpm for 15 minutes. The stirring was stopped and the sample for analysis was taken. The sample was filtrated using 0.45 μm filter. The phosphorus precipitate formation was identified by analysing the remaining liquid phase which inversely tells the removal of phosphorus from the liquid and the formation of phosphorus precipitate.

TABLE 6

| Sample | P-tot before treatment (mgP/l) | pH initial | pH after NaOH addition | $CaCl_2$-solution (μl) | Ortho-P (mgP/l) filtrated | P-tot (mgP/l) filtrated |
|---|---|---|---|---|---|---|
| 0 wastewater | 0.43 | | | | 0.20 | |
| 1 wastewater with added P | 5.4 | 7.0 | | | | 5.2 |
| Ca-6-1 | 5.4 | 6.8 | 9.0 | 135.7 | | 3.2 |
| Ca-6-2 | 5.4 | 7.1 | 9.6 | 135.7 | | 0.86 |
| Ca-6-4 | 5.4 | 6.9 | 10.6 | 135.7 | | 0.15 |
| Ca-6-5 | 5.4 | 6.9 | 11.0 | 135.7 | | 0.11 |
| Ca-6-6 | 5.4 | 7.0 | 9.1 | 195.4 | | 2.4 |
| Ca-6-7 | 5.4 | 7.1 | 9.5 | 195.4 | | 0.84 |
| Ca-6-8 | 5.4 | 7.0 | 10.0 | 195.4 | | 0.26 |
| Ca-6-9 | 5.4 | 7.0 | 10.5 | 195.4 | | 0.14 |
| Ca-6-10 | 5.4 | 7.0 | 11.0 | 195.4 | | 0.10 | c) Precipitation Using $CaCl_2$ and NaOH 4999.74 grams of wastewater with total phosphorus of 0.43 mg/l and dissolved ortho phosphorus of 0.20 mg/l was taken from the process. 264.6 mg of $Na_3PO_4$ was added to raise the phosphorus level to 10 mgP/l. 900 g of so prepared phosphorus rich wastewater was taken into a beaker. A motor mixer was turned on at the speed of 400 rpm. pH was adjusted to the desired level using 20% NaOH. The desired dosage of $CaCl_2$-solution having 9.77% Ca was added using a pipette for precipitating phosphorus. The vigorous 400 rpm stirring was continued for 10 seconds counted from the beginning of $CaCl_2$-solution addition, and then it was slowed down to 99 rpm for 15 minutes. The stirring was stopped and the sample for analysis was taken. The sample was filtrated using 0.45 μm filter. The phosphorus precipitate formation was identified by analysing the remaining liquid phase which inversely tells the removal of phosphorus from the liquid and the formation of phosphorus precipitate.

TABLE 7

| Sample | P-tot before treatment (mgP/l) | pH initial | pH after NaOH addition | $CaCl_2$-solution (μl) | Ortho-P (mgP/l) filtrated | P-tot (mgP/l) filtrated |
|---|---|---|---|---|---|---|
| 0 wastewater | 0.43 | | | | 0.20 | |
| 1 wastewater with added P | 10.4 | 7.1 | | | | 10.1 |
| Ca-7-1 | 10.4 | 7.1 | 9.0 | 271.4 | | 3.6 |
| Ca-7-2 | 10.4 | 7.2 | 9.5 | 271.4 | | 1.1 |
| Ca-7-3 | 10.4 | 7.2 | 10.1 | 271.4 | | 0.27 |
| Ca-7-4 | 10.4 | 7.1 | 10.6 | 271.4 | | 0.16 |
| Ca-7-5 | 10.4 | 7.2 | 11.0 | 271.4 | | 0.10 |
| Ca-7-6 | 10.4 | 7.1 | 9.1 | 390.8 | | 2.7 |
| Ca-7-7 | 10.4 | 7.1 | 9.5 | 390.8 | | 0.71 |
| Ca-7-8 | 10.4 | 7.1 | 10.0 | 390.8 | | 0.26 |
| Ca-7-9 | 10.4 | 7.1 | 10.5 | 390.8 | | 0.15 |
| Ca-7-10 | 10.4 | 7.1 | 11.0 | 390.8 | | 0.09 | d) Precipitation Using $Ca(OH)_2$ 4999.87 grams of wastewater with total phosphorus of 0.56 mg/l and dissolved ortho phosphorus of 0.27 mg/l was taken from the process. 132.3 mg of $Na_3PO_4$ was added to raise the phosphorus level to 5 mgP/l. 900 g of so prepared phosphorus rich wastewater was taken into a beaker. A motor mixer was turned on at the speed of 400 rpm. The desired dosage of solid $Ca(OH)_2$ having 55.00% Ca was carefully added crystal by crystal for precipitating phosphorus. The vigorous 400 rpm stirring was continued for 10 seconds after the addition of $Ca(OH)_2$, after which it was slowed down to 99 rpm for 15 minutes. The stirring was stopped and the sample for analysis was taken. The sample was filtrated using 0.45 μm filter. The phosphorus precipitate formation was identified by analysing the remaining liquid which inversely tells the removal of phosphorus from the liquid and the formation of phosphorus precipitate.

TABLE 8

| Sample | P-tot before treatment (mgP/l) | pH initial | $Ca(OH)_2$ (mg) | pH when sampling | Ortho-P (mgP/l) filtrated | P-tot (mgP/l) filtrated |
|---|---|---|---|---|---|---|
| 0 wastewater | 0.56 | | | | 0.27 | |
| 1 wastewater with added P | 5.6 | 6.7 | | 6.8 | 5.2 | 5.3 |

TABLE 8-continued

| Sample | P-tot before treatment (mgP/l) | pH initial | Ca(OH)$_2$ (mg) | pH when sampling | Ortho-P (mgP/l) filtrated | P-tot (mgP/l) filtrated |
|---|---|---|---|---|---|---|
| Ca-8-1 | 5.6 | 6.7 | 53.2 | 9.6 | | 0.85 |
| Ca-8-2 | 5.6 | 6.8 | 84.1 | 10.2 | | 0.20 |
| Ca-8-3 | 5.6 | 6.7 | 98.8 | 10.5 | | 0.15 |
| Ca-8-4 | 5.6 | 6.7 | 152.5 | 11.1 | | 0.12 | e) Precipitation Using CaO

The Ca(OH)$_2$ from the experiment d) was replaced by CaO which contained 69.33% Ca. The stirring was not stopped after 15 min reaction time at the stirring speed of 99 rpm when the sample was taken, but it was continued up to 60 min and the second sample was taken.

TABLE 9

| Sample | P-tot before treatment (mgP/l) | pH initial | CaO (mg) | Reaction time (min) | pH when sampling | Ortho-P (mgP/l) filtrated | P-tot (mgP/l) filtrated |
|---|---|---|---|---|---|---|---|
| 0 wastewater | 0.56 | | | | | 0.27 | |
| 1 wastewater with added P | 5.6 | 6.9 | | | 7.0 | 5.2 | 5.3 |
| Ca-9-1 | 5.6 | 6.9 | 87.1 | 15 | 10.0 | | 0.8 |
| | | | | 60 | 10.6 | | 0.12 |
| Ca-9-2 | 5.6 | 6.9 | 45.7 | 15 | 9.5 | | 1.63 |
| | | | | 60 | 10.1 | | 0.31 |
| Ca-9-3 | 5.6 | 6.9 | 120.6 | 15 | 11.0 | | 0.09 |
| | | | | 60 | 11.3 | | 0.10 |
| Ca-9-4 | 5.6 | 6.9 | 173.6 | 15 | 11.3 | | 0.09 |
| | | | | 60 | 11.5 | | 0.06 | f) Precipitation Using MgCl$_2$ 5 liters of wastewater was taken from the process. 7939.3 mg of Na$_3$PO$_4$ was added to raise the phosphorus level to 288 mgP/l. 900 ml of so prepared phosphorus rich wastewater was taken into a beaker and pH was adjusted to 9.4 or 11 with 10% HCl. A motor mixer was turned on at the speed of 400 rpm. Immediately after starting the mixing, the 7897 μl of MgCl$_2$ solution (Mg 3.6%, density 1.116 g/ml) and 3331 μl of NH$_4$Cl solution (N 5.2%, 1.048 g/ml) were added for precipitating phosphorus. The vigorous 400 rpm stirring was continued for 15 seconds, and then it was slowed down to 40 rpm for 20 minutes. During the 20-minute reaction time pH was kept at constant level with 20% NaOH. The phosphorus precipitate formation was identified by analysing the remaining orto-phosphorus and NH$_4$—N in the liquid phase.

TABLE 10

| | pH adjustment before P precipitation | | Addition of Mg and NH$_4$ | | pH adjustment during P precipitation | | | |
|---|---|---|---|---|---|---|---|---|
| Sample | Initial pH | Adjusted pH | MgCl$_2$ μl | NH$_4$Cl μl | N addition | pH after Mg and precipitation | pH after 20 min | Orto-P mg/l | NH4—N mg/l |
| 0 with added P | 11.8 | — | — | — | — | 11.8 | 288 | 1.30 |
| 1 with added P | 11.8 | 9.5 | 7897 | 3331 | 8.1 | 9.0 | 2.0 | 86.2 |
| 2 with added P | 11.8 | 11.4 | 7897 | 3331 | 8.5 | 10.9 | 1.2 | 97.4 | g) Precipitation Using Ferric or Aluminium Coagulant 9.99974 grams of wastewater was taken from the process. 264.6 mg of $Na_3PO_4$ was added to raise the phosphorus level to 5 mgP/l. 1000 g of so prepared phosphorus rich wastewater was taken into a beaker. A motor mixer was turned on at the speed of 350 rpm. Immediately after starting the mixing, the desired dosage of coagulant (either PIX-111 with Fe 13.61% and density 1.42 g/ml, or aluminium sulphate (ALS) with Al 3.94% and density 1.29 g/ml) for precipitating phosphorus was added using a pipette. The vigorous 350 rpm stirring was continued for 10 seconds, and then it was slowed down to 40 rpm for 10 minutes. The stirring was stopped and the sample was let to settle for 10 min. The phosphorus precipitate separated into the bottom of the beaker. The sample was taken at 3 cm depth from the top of the liquid surface. The sample was filtrated using 0.45 μm filter. The phosphorus precipitate formation was identified by analysing the remaining liquid phase which inversely tells the removal of phosphorus from the liquid and the formation of phosphorus precipitate.

TABLE 11

| Sample | Coagulant | Coagulant dosage (μl) | P-tot settled, unfiltrated (mgP/l) | P-tot settled, filtrated (mgP/l) | Turbidity (NTU) | pH | COD (mg/l) |
|---|---|---|---|---|---|---|---|
| 0 zero | — | — | 5.2 | 5.0 | 2.8 | 7.2 | 45.3 |
| 1 | PIX-111 | 76.7 | 1.0 | 0.41 | 1.1 | 6.3 | 34.8 |
| 2 | PIX-111 | 81.3 | 1.0 | 0.31 | 1.4 | 6.2 | 34.6 |
| 3 | PIX-111 | 86.0 | 0.78 | 0.20 | 1.2 | 6.2 | 33.9 |
| 4 | PIX-111 | 90.6 | 0.81 | 0.18 | 1.4 | 6.1 | 33.6 |
| 5 | ALS | 136.9 | 1.5 | 0.52 | 1.1 | 6.5 | |
| 6 | ALS | 145.5 | 1.2 | 0.32 | 1.2 | 6.4 | |
| 7 | ALS | 154.0 | 1.1 | 0.27 | 1.2 | 6.3 | |
| 8 | ALS | 162.6 | 0.86 | 0.17 | 1.0 | 6.2 | |

TABLE 12

| Sample | Coagulant | Coagulant dosage (μl) | P-tot settled, unfiltrated (mgP/l) | P-tot settled, filtrated (mgP/l) | Turbidity (NTU) | pH |
|---|---|---|---|---|---|---|
| 0 zero | — | — | 5.45 | 5.4 | 4.0 | 6.8 |
| 1 | PIX-111 | 76.7 | 1.37 | 0.53 | 1.5 | 6.1 |
| 2 | PIX-111 | 81.3 | 1.39 | 0.40 | 1.9 | 6.1 |
| 3 | PIX-111 | 86.0 | 1.17 | 0.28 | 1.7 | 6.1 |
| 4 | PIX-111 | 90.6 | 1.10 | 0.22 | 1.7 | 6.0 |
| 5 | ALS | 136.9 | 2.2 | 0.56 | 2.3 | 6.3 |
| 6 | ALS | 145.5 | 1.9 | 0.44 | 2.1 | 6.2 |
| 7 | ALS | 154.0 | 1.7 | 0.30 | 2.2 | 6.2 |
| 8 | ALS | 162.6 | 1.4 | 0.24 | 2.0 | 6.1 | h) Precipitation Using Ferric or Aluminium Coagulant 9.99947 grams of wastewater was taken from the process. 529.3 mg of $Na_3PO_4$ was added to raise the phosphorus level to 5 mgP/l. 1000 g of so prepared phosphorus rich wastewater was taken into a beaker. A motor mixer was turned on at the speed of 350 rpm. Immediately after starting the mixing, the desired dosage of coagulant (either PIX-111 with Fe 13.61% and density 1.42 g/ml, or ALS with Al 3.94% and density 1.29 g/ml) for precipitating phosphorus was added using a pipette. The vigorous 350 rpm stirring was continued for 10 seconds, and then it was slowed down to 40 rpm for 10 minutes. The stirring was stopped and the sample was let to settle for 10 min. The phosphorus precipitate separated into the bottom of the beaker. The sample was taken at 3 cm depth from the top of the liquid surface. The sample was filtrated using 0.45 μm filter. The phosphorus precipitate formation was identified by analysing the remaining liquid phase which inversely tells the removal of phosphorus from the liquid and the formation of phosphorus precipitate.

TABLE 13

| Sample | Coagulant | Coagulant dosage (µl) | P-tot settled, unfiltrated (mgP/l) | P-tot settled, filtrated (mgP/l) | Turbidity (NTU) | pH | COD (mg/l) |
|---|---|---|---|---|---|---|---|
| 0 zero | — | — | 10.2 | 9.8 | 3.5 | 7.4 | 45.2 |
| 1 | PIX-111 | 153.4 | 0.86 | 0.34 | 1.1 | 6.1 | |
| 2 | PIX-111 | 162.7 | 0.60 | 0.19 | 0.77 | 5.9 | 29.5 |
| 3 | PIX-111 | 172.0 | 0.48 | 0.1 | 0.80 | 5.8 | 27.7 |
| 4 | PIX-111 | 181.3 | 0.43 | 0.08 | 0.78 | 5.7 | 25.7 |
| 5 | ALS | 273.8 | 1.1 | 0.37 | 1.0 | 6.0 | |
| 6 | ALS | 290.9 | 0.90 | 0.16 | 1.0 | 6.0 | |
| 7 | ALS | 308.0 | 0.90 | 0.11 | 1.3 | 5.9 | |
| 8 | ALS | 325.1 | 0.81 | 0.09 | 1.3 | 5.7 | |

TABLE 14

| Sample | Coagulant | Coagulant dosage (µl) | P-tot settled, unfiltrated (mgP/l) | P-tot settled, filtrated (mgP/l) | Turbidity (NTU) | pH |
|---|---|---|---|---|---|---|
| 0 zero | — | — | 11.1 | 11.2 | 3.0 | 6.9 |
| 1 | PIX-111 | 153.4 | 1.19 | 0.73 | 0.87 | 5.9 |
| 2 | PIX-111 | 162.7 | 0.85 | 0.36 | 0.97 | 5.7 |
| 3 | PIX-111 | 172.0 | 0.62 | 0.19 | 0.98 | 5.6 |
| 4 | PIX-111 | 181.3 | 0.45 | 0.10 | 0.92 | 5.4 |
| 5 | ALS | 273.8 | 1.6 | 0.58 | 1.4 | 5.9 |
| 6 | ALS | 290.9 | 1.6 | 0.36 | 1.7 | 5.8 |
| 7 | ALS | 308.0 | 1.4 | 0.21 | 1.7 | 5.7 |
| 8 | ALS | 325.1 | 1.5 | 0.11 | 2.2 | 5.6 | i) Precipitation Using Ferric Coagulant in Larger Scale 52.93 grams of $Na_3PO_4$ was dissolved into one liter of water. 1000 kilograms of wastewater was taken from the process and placed in a 1 m³ IBC-container that was equipped with a motor stirrer. Stirring was turned on and the prepared $Na_3PO_4$-solution was added into the mixing wastewater to raise the phosphorus level to 10 mgP/l. 241.7 g of PIX-111 (Fe 13.8%, density 1.42 g/ml) was fast added pouring from a bottle into a well-mixed container. Mixing was continued for 10 seconds after the PIX-111 addition, where after it was stopped. Precipitate was let to settle over 1 hour. Once it had settled, about 600 liters of the clear water from the surface of the container was carefully removed using a pump. The settled precipitate was separately collected and placed into a conical reactor where it was let to settle again. Once the precipitate had settled into the bottom of the conical reactor, it was carefully collected through the bottom valve and further dewatered with vacuum filtration in Buchner funnel in the lab scale. The wet cake contained 85% of water after the filtration in the lab. The dewatered cake was dried in the oven at 50° C. over the night, and the dried cake was analysed.

TABLE 15

| Cake composition, element | Quantitatively analysed by ICP-OES |
|---|---|
| Fe | 33.0% |
| P | 9.3% |
| Na | 0.04% |

Example 3

Influence of the Separation of the Mechanical Sludge on the Biological Treatment Step Incoming wastewater to mechanical separation was taken from the wastewater treatment plant, and treated in three different ways:

Batch 1 was done without any chemical addition into 400 litres of incoming wastewater (referred as No chemicals).

Batch 2 was done by adding 36 ml ferric chloride (PIX-111) into 200 litres of incoming wastewater (referred to as PIX-111).

Batch 3 was done by adding 1500 ml of polymer solution (C492, a PAM) (0.1% w/w) into the total volume of 300 liters of incoming wastewater (200 litres and 100 litres batches) (referred as C492).

The containers were first filled with the incoming wastewater. A vigorous mixing was turned on. The used mixer was a drilling machine with a concrete mixer blade that is normally used at construction sites. The chemicals disclosed were added fast into Batches 2 and 3. Mixing was turned off 5-10 seconds after the chemical additions when the number of formed flocs were the highest by a visual evaluation. All three batches were let to settle for 1 h 45 min. Subsequently, supernatant water was drained from the containers. In the PIX-111 and C492 containers, supernatant was drained through thin nylon tights that was used as a filter cloth, resulting in about 1-2 litres of collected sludge. Unlike C492, PIX-111 was clogging the filter and it was further dewatered by pressing. In Batch 1, the settled fraction of about 40 litres was drained through a metal sieve. All the effluents were collected and analysed and removal rates calculated compared to the untreated incoming wastewater (see Table 16).

TABLE 16

Analysed results and calculated removal rates.

| Sample | TS (mg/l) | VS (mg/l) | P-tot (mg/l) | VS removal % | P removal % |
|---|---|---|---|---|---|
| Untreated incoming wastewater, not settled | 643 | 410 | 8.2 | | |
| Batch 1 - No chemicals | 449 | 260 | 7.9 | 37 | 4 |
| Batch 2 - PIX-111 | 446 | 196 | 4.2 | 52 | 49 |
| Batch 3 - C492 | 344 | 122 | 6.4 | 70 | 22 |

From the annual reports of wastewater treatment plants in Espoo, Helsinki, Tampere and Turku in Finland (referred to as Average Finland), representing about 30% of the Finnish population, the average figures presented in Table 17 can be calculated.

TABLE 17

Average energy contents of different flows at selected Finnish wastewater treatment plants.

| | Average Finland | |
|---|---|---|
| | Energy content (kWh/a/p) | Percentage (%) |
| Influent | 267 | 100 |
| Mechanical sludge | 166 | 62 |
| Biological treatment loss | 67 | 25 |
| Biological treatment aeration electricity | 28 | |
| Biological sludge | 15 | 6 |
| Effluent (treated water) | 19 | 7 |

(a = year, p = person equivalent)

The needed electricity in secondary aeration can be calculated for Batches 1-3. The results for mechanical sludge separation, i.e. primary sludge separation, (see Table 16) are used. After the mechanical sludge separation a biological treatment step, a secondary step, may be applied. From the biological treatment loss and biological treatment aeration electricity of Average Finland, a factor of 0.41 can be calculated (28/68). This factor can be used for calculating the needed biological treatment aeration electricity for Batches 1-3. The energy content of influent and effluent are kept the same for Batches 1-3 as Average Finland values. Energy share loss of secondary influent in biological treatment step is estimated to be slightly less than Average Finland.

TABLE 18

Calculated biological treatment aeration electricity consumed for three different mechanical treatment steps (No Chemicals, PIX-111 and C492)

| | Batch 1, No Chemicals | | Batch 2, PIX-111 | | Batch 3, C492 | |
|---|---|---|---|---|---|---|
| | Energy content (kWh/a/p) | Percentage (%) | Energy content (kWh/a/p) | Percentage (%) | Energy content (kWh/a/p) | Percentage (%) |
| Influent | 267 | 100 | 267 | 100 | 267 | 100 |
| Mechanical sludge | 99 | 37 | 139 | 52 | 187 | 70 |
| Biological treatment loss | 105 | 39 | 77 | 29 | 43 | 16 |
| Biological treatment aeration electricity | 43 | | 32 | | 18 | |
| Biological treatment sludge | 45 | 17 | 33 | 12 | 18 | 7 |
| Effluent (treated water) | 19 | 7 | 19 | 7 | 19 | 7 |

So it can be concluded that the least amount of electricity is consumed in biological treatment aeration when the mechanical treatment step is done according to this invention. From the table above, it is noticed that 44% less biological treatment aeration electricity is used using C942 treatment than when using inorganic coagulants (PIX-111) in a mechanical treatment step, and 58% less compared to the situation without any chemicals.

The amount of phosphorus available for recovery and separation in a post-treatment step can be calculated using the phosphorus removal rates from Table 16 and Average Finland values. Average Finland values are presented in Table 19 below. It is assumed the influent is the same as Average Finland in all cases, and the effluent for Batch 2 (PIX-111) and Batch 3 (C492), is the same as for Average Finland. For Batch 1 (No chemicals) the effluent phosphorus level is estimated to stay slightly higher. Phosphorus content in biological sludge of Batch 2 C492 is estimated to be 1.5%.

TABLE 19

Average phosphorus contents of different flows at selected Finnish wastewater treatment plants.

| | Average Finland | |
|---|---|---|
| | Phosphorus (kg/a/p) | Percentage (%) |
| Influent | 0.73 | 100 |
| Mechanical sludge | 0.51 | 70 |
| Biological sludge | 0.19 | 26 |
| Post-precipitated sludge | 0 | 0 |
| Effluent (treated water) | 0.03 | 4 |

TABLE 20

Phosphorus in different flows for three different mechanical treatment steps (No Chemical, PIX-111 and C492)

|  | Batch 1, No Chemicals | | Batch 2, PIX-111 | | Batch 3, C492 | |
| --- | --- | --- | --- | --- | --- | --- |
|  | Phosphorus (kg/a/p) | Percentage (%) | Phosphorus (kg/a/p) | Percentage (%) | Phosphorus (kg/a/p) | Percentage (%) |
| Influent | 0.73 | 100 | 0.73 | 100 | 0.73 | 100 |
| Mechanical sludge | 0.03 | 4 | 0.36 | 49 | 0.16 | 22 |
| Biological sludge | 0.66 | 91 | 0.34 | 47 | 0.05 | 6 |
| Post-treatment sludge | 0 | 0 | 0 | 0 | 0.49 | 68 |
| Effluent (treated water) | 0.04 | 5 | 0.03 | 4 | 0.03 | 4 |

Therefore, in the invention's treatment Batch 3 C492 there will be 68% of incoming phosphorus available for recovery and separation in the post-treatment step as phosphates.

Example 4

Phosphorus Removal from Wastewater Using Ion Exchange Resins

Phosphorus removal by utilizing ion exchange in the post-treatment was simulated in the laboratory scale. Phosphorus containing wastewater at phosphorus concentration of 5 mg/kg was made by mixing lab grade sodium phosphate ($Na_3PO_4$) with outgoing wastewater from the wastewater treatment plant.

Commercial resins have been used for phosphorus removal from wastewater. Example 1 uses a strong basic resin containing cross linked polystyrene. Example 2 uses a weak basic resin containing macro-porous with tertiary amine group. Example 3 uses a weakly basic resin containing chelating bispicolyamine functional group.

10 ml of resins was added into 100 g wastewater (P=5 mg/kg) at ambient temperature in a laboratory beaker and the solutions were stirred very slowly for 1 hour. Samples were taken after 1 hour and the concentration of phosphorus was analyzed by ICP-MS. The results are presented in table 21.

TABLE 21

Results of phosphorus removal using ion exchange.

| Experiment | Resins | P in mg/kg | P out mg/kg | P removal % |
| --- | --- | --- | --- | --- |
| 1 | Strong basic resin | 5 | 0.42 | 91.6 |
| 2 | Weak basic resin | 5 | 0.9 | 82 |
| 3 | Selective week basic resing | 5 | 3.3 | 34 |

Example 5

Content of Obtained Phosphate Product

The phosphorus recovery in the post-treatment was simulated in the laboratory scale using wastewater from a wastewater treatment plant having a biological treatment process. As the wastewater treatment practices today require the removal of phosphorus, the total phosphorus in the wastewater was reduced to meet these requirements at the plant, to below 0.3 mgP/l. Thus the phosphorus level was first raised to the desired level using $Na_3PO_4$.

52.93 grams of $Na_3PO_4$ was dissolved into one liter of water. 1000 liters of wastewater was taken from the process and placed in a 1 m$^3$ IBC-container that was equipped with a motor stirrer. Stirring was turned on and the prepared $Na_3PO_4$-solution was added into the mixing wastewater to raise the phosphorus level to 10 mgP/l. 241.7 g of PIX-111 (Fe 13.8%, density 1.42 g/ml) was fast added pouring from a bottle into a well-mixed container. Mixing was continued for 10 seconds after the PIX-111 addition, where after it was stopped. Precipitate was let to settle over 1 hour. Once it had settled, about 600 liters of the clear water from the surface of the container was carefully removed using a pump. The settled precipitate was separately collected and placed into a conical reactor where it was let to settle again. Once the precipitate had settled into the bottom of the conical reactor, it was carefully collected through the bottom valve and further dewatered with vacuum filtration in Buchner funnel in the lab scale. The wet cake contained 85% of water after the filtration in the lab. The dewatered cake was dried in the oven at 50° C. over the night, and the dried cake was analysed. A $FePO_4$ rich precipitate was obtained.

In table 22 below it is shown the measured values for phosphorus, iron, carbon and the metal impurities of the obtained precipitate, the measured phosphorus and carbon in regular sludge from the same plant as the precipitate, the limit values of metal impurities in accepted Finnish fertilizers, the measured values of standard sludges, and the limit values of metal impurities for sewage sludge according to the directive when sludge is used on the agricultural land.

In table 22 it is seen that $FePO_4$ precipitate is rich in phosphorus and contains higher amounts of phosphorus than the regular sludge from the same plant.

Table 22 shows clearly that a very pure $FePO_4$ containing precipitate was obtained. Very low amounts of metal impurities were measured and all these impurities were below the limit values of accepted fertilizers in Finland. The precipitate contained also lower amounts of impurities than the standard sludges.

Additionally, it can be seen that the $FePO_4$ precipitate contains lower amounts of metal impurities than standard sludges and is purer fertilizer material when compared to standard sludges to be used as such on agricultural land or in the fertilizer production process.

It can be seen that the organic carbon content of $FePO_4$ precipitate is much lower than in regular sludge from the same plant. Therefore, the organic impurities are also reduced in $FePO_4$ precipitate compared to regular sludge.

TABLE 22

Measured FePO₄ precipitate and regular sludge properties. Limit values for fertilizers in Finland. Values for standard sewage sludges used on agricultural land in Finland, Sweden and Germany. Limit values for sewage sludge used on agricultural land according to Directive 86/278/EEC.

| | Fe (% of DS) | P (% of DS) | Cd | As | Cr | Cu | Hg (mg/kg of DS) | Ni | Pb | Zn | Organic C (% of DS) |
|---|---|---|---|---|---|---|---|---|---|---|---|
| FePO4 precipitate from plant 1 | 33.0 | 9.3 | 0.054 | 0.91 | 22 | 32 | 0.16 | 14 | 0.98 | 100 | 10 |
| Regular sludge, plant 1 | | 3.5 | | | | | | | | | 32.3 |
| Limit values for fertilizers in Finland | — | | 1.5 | 25 | 300 | 600 | 1 | 100 | 100 | 1500 | |
| Standard sludge, Finland | | 2.4 | 0.6 | — | 18 | 244 | 0.4 | 30 | 8.9 | 332 | |
| Standard sludge, Sweden | | 2.7 | 0.9 | — | 26 | 349 | 0.6 | 15 | 24 | 481 | |
| Standard sludge, Germany | | 3.7 | 1 | — | 37 | 300 | 0.4 | 25 | 37 | 713 | |
| Directive 86/278/EEC (current limits for sludge) | — | | 20-40 | — | — | 1000-1750 | 16-25 | 300-400 | 750-1200 | 2500-4000 | |

DS = dry solids

Table 22 shows that by retrieving the phosphorus in the end of the wastewater treatment provides a phosphorus containing precipitate/slurry/material for use as fertilizer which has not only increased phosphorus content but contains also considerably lower amounts of unwanted metals compared to sludges which may have an output of phosphorus at earlier stages of the wastewater process.

For the phosphorus rich slurry, about 3 times as much phosphorus was obtained as the others. Also, the phosphorus rich slurry contained at most one eleventh of the amount of cadmium, one seventh of the amount of chromium, one ninth of the amount of lead, one third of zinc and less than half the amount of mercury found in the standard process sludges. From this it is clearly shown that in a preferred embodiment the fertilizer is made from slurries where phosphorus is not precipitated until the very end of the wastewater treatment process.

The FePO₄ precipitate from plant 1 mentioned herein is the type of precipitate that could be directly distributed as a fertilizer, without any further treatment, onto soils in need of fertilizing. Naturally, this type of precipitate could also be further treated to include nitrogen, potassium and/or additional phosphorus containing compounds. Also, the material could be further dried by evaporation of any water present and granulated, and optionally coated. Also the material could be only dried without any granulation and then a particulate product is obtained

The invention claimed is:

1. A process for recovering phosphates from wastewater in industrial and municipal waste treatment plants, by
in a mechanical treatment step, adding to the wastewater at least one organic coagulant or polymer, selected from the group consisting of polyacrylamide, melamine formaldehydes, polyamine, polyDADMAC, tannins, lignin, starch, cellulose, hemicellulose, alginate, guar gum, chitin, chitosan, and cationic or anionic derivatives thereof, and any combination thereof, that leaves dissolved phosphorus, including dissolved phosphate, in the mechanically treated wastewater,
separating solids as a mechanical sludge from the mechanically treated wastewater by a physical separation step, preferably selected from the group sedimentation, flotation or filtration,
carrying the phosphate-containing treated wastewater in a post-treatment step,
adding to the phosphate-containing treated wastewater at least one chemical precipitant to precipitate the dissolved phosphate from said treated wastewater into solid phosphates, and
separating the precipitated solid phosphates from the treated wastewater to recover the phosphates and to form a final effluent,
further comprising:
prior to the post-treatment step, carrying the phosphate-containing mechanically treated wastewater via a biological treatment step, wherein a biological sludge is separated from the treated wastewater, and
anaerobically digesting at least one of the mechanical sludge and the biological sludge to release phosphate bound to sludge solids into a water phase and returning the water phase to a previous wastewater treatment step that is before the mechanical treatment.

2. The process according to claim 1, wherein said at least one organic coagulant or polymer is selected from polyacrylamide, melamine formaldehydes, tannins, polyamine and polyDADMAC, preferably from polyacrylamide, polyamine and polyDADMAC.

3. The process according to claim 1, wherein the dissolved phosphate is precipitated using at least one chemical precipitant selected from the group consisting of iron, aluminum, calcium and magnesium salts, to provide the solid phosphates.

4. The process according to claim 3, wherein said at least one chemical precipitant is selected from the group consisting of calcium hydroxide, calcium oxide, calcium chloride, calcium sulphate, magnesium chloride, magnesium sulphate, magnesium oxide, magnesium hydroxide, aluminium sulphate, aluminium chloride, polyaluminium chloride, polyaluminium sulphate, polyaluminium nitrate, aluminium chlorohydrate, aluminium hydroxide, sodium aluminate, ferric chloride, ferric sulphate, ferric chloro sulphate, ferrous chloride, ferrous sulphate, ferrous chloro sulphate ferric hydroxide, ferrous hydroxide and sodium hydroxide, and any combination thereof.

5. The process according to claim 1, wherein the solid phosphates are separated from the treated wastewater using a physical separation step and/or a chemical-physical separation step.

6. The process according to claim 5, wherein the physical separation step is selected from the group filtration, flotation, centrifugation or sedimentation, preferably by using a disk filter, chamber filter press, decanter centrifuge, and/or hydrocyclone.

7. The process according to claim 5, wherein the chemical-physical separation step is selected from the group adsorption and/or ion exchange.

8. Fertilizer or fertilizer raw material comprising a phosphate obtained by the process according to claim 1.

9. Use of a phosphate obtained by the process according to claim 1, as or in the production of a fertilizer or fertilizer raw material.

* * * * *